United States Patent
Fitzpatrick et al.

(10) Patent No.: US 9,914,371 B2
(45) Date of Patent: Mar. 13, 2018

(54) SEAT MOVER SYSTEM

(71) Applicant: Faurecia Automotive Seating, LLC, Auburn Hills, MI (US)

(72) Inventors: Robert C Fitzpatrick, Holland, MI (US); Jeffery T Bonk, Chesterfield, MI (US); Timothy L Moulton, Newport, RI (US); Jared A Judson, Medford, MA (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 59 days.

(21) Appl. No.: 15/146,281

(22) Filed: May 4, 2016

(65) Prior Publication Data

US 2016/0325642 A1 Nov. 10, 2016

Related U.S. Application Data

(60) Provisional application No. 62/156,916, filed on May 5, 2015.

(51) Int. Cl.
| | |
|---|---|
| *A47C 1/00* | (2006.01) |
| *B60N 2/04* | (2006.01) |
| *B60N 2/16* | (2006.01) |
| *B60N 2/02* | (2006.01) |
| *B60N 2/30* | (2006.01) |

(52) U.S. Cl.
CPC ............ *B60N 2/045* (2013.01); *B60N 2/0232* (2013.01); *B60N 2/1605* (2013.01); *B60N 2/1615* (2013.01); *B60N 2/1625* (2013.01); *B60N 2/3045* (2013.01)

(58) Field of Classification Search
CPC .... B60N 2/3045; B60N 2/305; B60N 2/3013; B60N 2/36; B60N 2/045; B60N 2/1625; B60N 2/1615; B60N 2/1605; B60N 2/06; B60N 2/04; A61G 5/1059; A61G 5/1075; A61G 5/1056; A61G 5/107; B66F 7/00; B66F 7/06; B66F 7/0641
USPC .......... 297/325, 338, 344.17, 337, 327, 328, 297/331, 333, 344.15, 344.13
See application file for complete search history.

(56) References Cited

U.S. PATENT DOCUMENTS

| | | | |
|---|---|---|---|
| 3,075,736 A | 1/1963 | Freedman | |
| 4,884,843 A * | 12/1989 | DeRees | B60N 2/045 297/331 |
| 4,890,810 A | 1/1990 | Sakamoto | |
| 4,993,678 A * | 2/1991 | Easter | B60N 2/1615 248/371 |
| 5,014,960 A | 5/1991 | Kimura | |
| 5,154,402 A * | 10/1992 | Hill | B60N 2/502 248/429 |
| 5,586,740 A | 12/1996 | Borlinghaus et al. | |
| 5,697,674 A * | 12/1997 | Aufrere | B60N 2/1615 297/284.2 |

(Continued)

FOREIGN PATENT DOCUMENTS

GB 563578 A 8/1944

*Primary Examiner* — Chi Q Nguyen
(74) *Attorney, Agent, or Firm* — Barnes & Thornburg LLP

(57) ABSTRACT

A seat system for use in a vehicle includes a vehicle seat and a seat mover system. The vehicle seat is arranged to support an occupant above a vehicle floor included in the vehicle. The seat mover system is configured to vary a tilt, height, and longitudinal position of the vehicle seat relative to the vehicle floor.

16 Claims, 13 Drawing Sheets

(56) References Cited

U.S. PATENT DOCUMENTS

| | | |
|---|---|---|
| 7,926,876 B2 | 4/2011 | Zadai et al. |
| 8,770,646 B2 | 7/2014 | Line et al. |
| 9,050,914 B2 * | 6/2015 | Hage-Hassan ....... B60N 2/3045 |
| 9,351,889 B2 * | 5/2016 | Mulhern ................... A61G 5/04 |
| 2005/0046129 A1 * | 3/2005 | Antonishak ............ A61G 5/043 |
| | | 280/47.4 |
| 2006/0087166 A1 * | 4/2006 | Trippensee ............ A61G 5/043 |
| | | 297/338 |
| 2007/0084648 A1 * | 4/2007 | DuFresne ............ A61G 5/1059 |
| | | 180/65.1 |
| 2007/0246985 A1 * | 10/2007 | Sahi ......................... B60N 2/12 |
| | | 297/331 |
| 2010/0072800 A1 * | 3/2010 | Weber .................... B60N 2/508 |
| | | 297/344.15 |
| 2012/0169099 A1 * | 7/2012 | Horiguchi ................ B60N 2/06 |
| | | 297/314 |

\* cited by examiner

# SEAT MOVER SYSTEM

PRIORITY CLAIM

This application claims priority under 35 U.S.C. § 119(e) to U.S. Provisional Application No. 62/156,916, filed May 5, 2015, which is expressly incorporated by reference herein.

BACKGROUND

The present disclosure relates to a seat, and particularly to a seat included in a vehicle. More particularly, the present disclosure relates to a seat mover system for a seat used to vary an arrangement of the seat.

SUMMARY

According to the present disclosure, a seat system for use in a vehicle includes a vehicle seat and a seat foundation. The vehicle seat is arranged to support the occupant above a vehicle floor included in the vehicle. The seat foundation is arranged to couple the seat system to the vehicle floor.

In illustrative embodiments, the seat system further includes a seat mover system configured to vary tilt, height, and longitudinal position of the vehicle seat relative to the vehicle floor. The seat mover system causes the vehicle seat to move continuously from one configuration to a different configuration without discrete or separate tilt, height, and longitudinal movements. During the movement, tilt, height, and longitudinal position are all varied together in parallel to arrive at the different configuration. In illustrative embodiments, the seat mover system includes two powered scissor jacks that cooperate together to vary height and tilt of the vehicle seat and two rotational units that allow each scissor jack to pivot about a lateral pivot axis and provide fore/aft translational movement of the vehicle seat.

In illustrative embodiments, the seat system includes a seat mover system arranged to move the vehicle seat relative to the seat foundation. The seat mover system includes a first lift unit configured to provide means for moving the vehicle seat relative to the seat foundation to vary one or both of a height and a tilt angle of the vehicle seat, a second lift unit configured to provide means for moving the vehicle seat relative to the seat foundation to vary one or both of the height and the tilt angle of the vehicle seat, and a rotator unit configured to provide means for moving the vehicle seat relative to the seat foundation to vary one or both of the height and a translational position of the vehicle seat.

In illustrative embodiments, the first lift unit includes a first mover and a first actuator. The first mover interconnects the rotator unit and the vehicle seat. The first mover is configured to expand and contract radially relative to a first pivot axis to cause a front end of the seat mover system to move radially relative to the first pivot axis. The first actuator is connected to the first mover and configured to drive expansion and contraction of the first mover.

In illustrative embodiments, the second lift unit includes a second mover and a second actuator. The second mover interconnects the rotator unit and the vehicle seat. The second mover is configured to expand and contract radially relative to a second pivot axis to cause a rear end of the seat mover system to move radially relative to the second pivot axis. The second actuator is connected to the second mover and configured to drive expansion and contraction of the second mover.

In illustrative embodiments, the rotator unit includes a third mover, second mounts, and a third actuator. The third mover is arranged to move the first lift unit circumferentially about the first pivot axis relative to the vehicle floor. The second mounts interconnect the second lift unit and the seat foundation. The third actuator is configured to drive the third mover.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a seat system in accordance with the present disclosure showing that the seat system includes a vehicle seat for supporting an occupant in a vehicle above a floor of the vehicle, a seat foundation coupled to the floor of the vehicle, and a seat mover system interconnecting the vehicle seat to the seat foundation to cause the vehicle seat to move relative to the seat foundation so that the occupant is supported at various configurations of heights, tilt angles, and translational positions relative to the vehicle floor and further showing that the seat mover system includes first and second lift units configured to expand and contract to vary the height and tilt of the vehicle seat and a rotator unit configured to rotate the first and second lift units to move the vehicle seat forward and rearward relative to the seat foundation;

FIG. 2 is a partial elevation and diagrammatic view of the seat system of FIG. 1 showing that the first and second lift units are in a fully-raised position and the rotator unit is in a forward arrangement to cause the seat mover system to be in a fully-raised forward configuration to cause the vehicle seat to support an occupant a relatively large height above the floor of the vehicle and toward a front of the vehicle;

FIG. 3 is a view similar to FIG. 1 showing that the seat mover system has been moved from the fully-raised forward configuration to a fully-raised rearward configuration by rotating the first and second lift units with the rotator unit to cause the vehicle seat to move toward a back of the vehicle while maintaining the occupant at about the relatively large height above the floor of the vehicle throughout the movement;

FIG. 4 is view similar to FIG. 2 of the seat system of FIG. 3 showing that first and second lift units are in the fully-raised position and the rotator unit is in a rearward arrangement to cause the seat mover system to be in the fully-raised rearward configuration to cause the vehicle seat to support an occupant a relatively large height above the floor of the vehicle and toward the back of the vehicle;

FIG. 5 is an exploded assembly and diagrammatic view of the seat system of FIG. 1 showing that the seat system includes, from top to bottom, the vehicle seat, the seat mover system including the first lift unit, the second lift unit, and the rotator unit, and the seat foundation;

FIG. 6 is an exploded assembly view of portions of the seat system of FIG. 1 showing that the seat system includes, from top to bottom, the seat frame included in the vehicle seat, the seat mover system including the first lift unit having a first mover and a first actuator configured to cause the first mover to expand and contract, the second lift unit having a second mover and a second actuator configured to cause the second mover to expand and contract, and the rotator unit having a third mover and a third actuator configured to cause the third mover to rotate about a front pivot axis and cause the first lift unit to rotate about the front pivot axis and the second lift unit to pivot about a rear pivot axis, and the seat foundation including first and second floor mounts coupled to the vehicle floor;

FIG. 7 is a diagrammatic view of an envelope of motion for the seat mover system of FIG. 1 showing a range of possible configurations of the seat mover system and that the fully-raised and the fully-lowered positions define vertical boundaries for the seat mover system, the forward and rearward arrangements define horizontal boundaries for the seat mover system, and that the seat mover system is configured to move within the vertical and horizontal boundaries into a plurality of partially expanded positions and intermediate arrangements;

FIGS. 8-10 are a series of elevation views of the seat mover system of FIG. 1 showing that the seat mover system is configured to move between fully-raised configurations in which the seat system supports an occupant a relatively large height (h1) above the vehicle floor as shown in FIG. 8, lowered configurations in which the seat system supports an occupant a relatively small height (h3) above the vehicle floor as shown in FIG. 10, and at least one partially raised configuration in which the seat system supports an occupant at a height (h2) above the vehicle floor between the fully-raised configuration and the lowered configuration as shown in FIG. 9;

FIG. 8 is an elevation view of the seat mover system of FIG. 1 showing that the first and second lift units are in the fully-raised position and the rotator unit is in an intermediate arrangement to cause the seat mover system to be in the fully-raised intermediate configuration to cause the vehicle seat to support an occupant at the relatively large height (h1) and about midway between the forward and rearward arrangements;

FIG. 9 is a view similar to FIG. 8 showing that the first and second lift units are in a partially raised position and the rotator unit is in the intermediate arrangement to cause the seat mover system to be in a partially-raised intermediate configuration to cause the vehicle seat to support an occupant at the intermediate height (h2) and about midway between the forward and rearward arrangements;

FIG. 10 is a view similar to FIG. 9 showing that the first and second lift units are in a fully-lowered position and the rotator unit is in the intermediate arrangement to cause the seat mover system to be in a fully-lowered intermediate configuration to cause the vehicle seat to support an occupant at the relatively small height (h3) and about midway between the forward and rearward arrangements;

FIGS. 11-13 are a series of elevation views of the seat mover system of FIG. 1 showing that the seat mover system is configured to move between a forward configurations in which the seat system supports an occupant toward the front of the vehicle as shown in FIG. 11, rearward configurations in which the seat system supports an occupant toward the back of the vehicle as shown in FIG. 13, and at least one intermediate configuration in which the seat system supports an occupant at an intermediate configuration between the forward and rearward arrangements as shown in FIG. 12;

FIG. 11 is an elevation view of the seat mover system of FIG. 1 showing that the first and second lift units are in the fully-raised position and the rotator unit is in the forward arrangement to cause the seat mover system to be in the fully-raised forward configuration to cause the vehicle seat to support an occupant a relatively large height above the floor of the vehicle and toward the front of the vehicle;

FIG. 12 is a view similar to FIG. 11 showing that the first and second lift units are in the fully-raised position and the rotator unit is in the intermediate arrangement to cause the seat mover system to be in the fully-raised intermediate configuration to cause the vehicle seat to support an occupant a relatively large height above the floor of the vehicle and about midway between the forward and rearward arrangements;

FIG. 13 is a view similar to FIG. 12 showing that the first and second lift units are in the fully-raised position and the rotator unit is in the rearward arrangement to cause the seat mover system to be in the fully-raised rearward configuration to cause the vehicle seat to support an occupant a relatively large height above the floor of the vehicle and toward the back of the vehicle;

FIG. 14 is a diagrammatic view of the seat system of FIG. 1 showing that the seat system includes the vehicle seat having the seat bottom and the seat back, the seat mover system including the first lift unit including the first actuator and the first mover that includes a first mover housing, a first lift arm mover, and a first support arm, the second lift unit including the second actuator and the second mover that includes a second mover housing, a second lift arm mover, and a second support arm, and the rotator unit including the third actuator, second mounts, and the third mover that includes an axle and a lift-unit coupler having first mover mounts and rotator wheels coupled to the first mover mounts, and the seat foundation including the first floor mounts and the second floor mounts;

FIG. 15 is a perspective view of the first mover included in the first lift unit showing that the first lift unit includes the first mover housing extending along a first screw axis, the first lift arm mover coupled pivotably to the first mover housing for moving the first lift arm housing radially relative to the first pivot axis, and the first support arm coupled pivotably to the first mover housing and the first lift arm mover;

FIG. 16 is a perspective view of a front portion of the seat mover system of FIG. 1 showing the first lift unit in a lowered position in which the first support arms are positioned near a center of the first mover housing to cause the first mover housing and a front of the seat frame to be spaced apart from the vehicle floor by a relatively small height and suggesting that the first lift unit is configured to move between the lowered position and the fully-raised position independent of the second lift unit to vary a tilt and height of the vehicle seat;

FIG. 17 is a view similar to FIG. 16 showing the first lift unit has moved to the partially-raised position in which the first support arms are positioned away from the center of the first mover housing to cause the first mover housing and a front of the seat frame to be spaced apart from the vehicle floor by a relatively larger height;

FIG. 18 is a perspective view of the second mover included in the second lift unit showing that the second lift unit includes the second mover housing extending along a second screw axis, the second lift arm mover coupled pivotably to the second mover housing for moving the second lift arm housing radially relative to the second pivot axis, and the second support arm coupled pivotably to the second mover housing and the second lift arm mover;

FIG. 19 is a perspective view of a rear portion of the seat mover system of FIG. 1 showing the second lift unit in a lowered position in which the second support arms are positioned near a center of the second mover housing to cause the second mover housing and a back of the seat frame to be spaced apart from the vehicle floor by a relatively small height and suggesting that the second lift unit is configured to move between the lowered position and the fully-raised position independent of the first lift unit to vary a tilt and height of the vehicle seat;

Figures 1, 2:
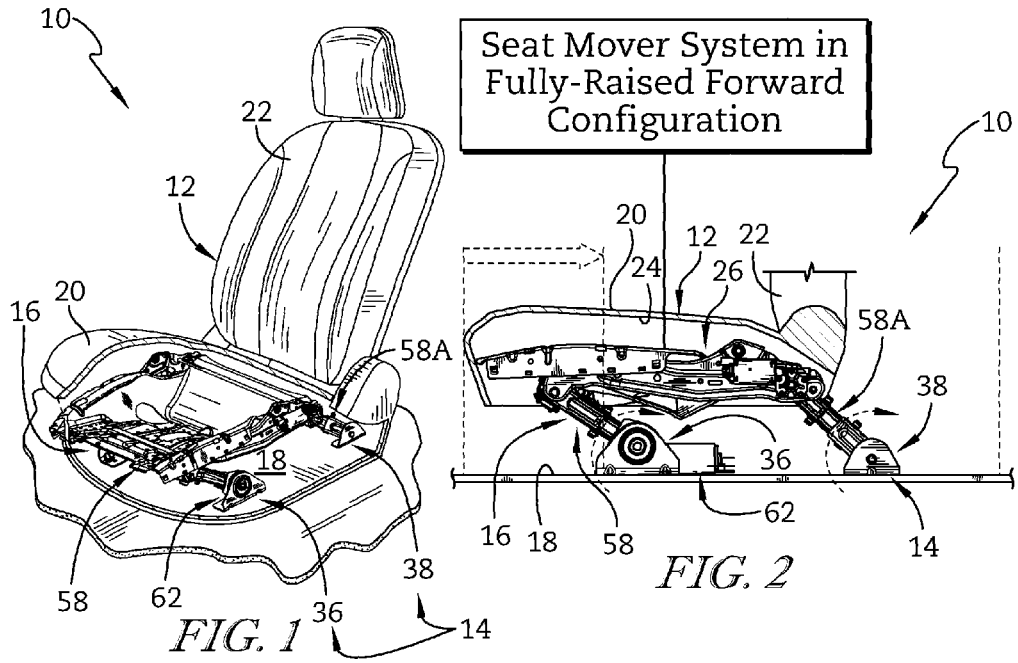
Figure 22:
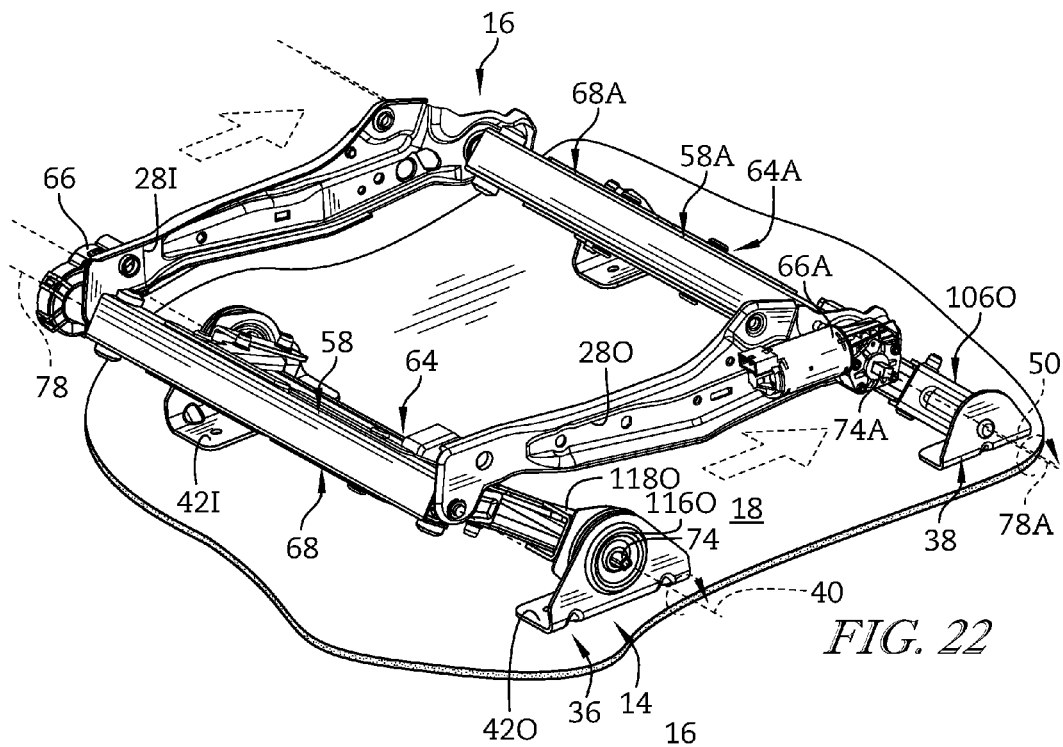
Figure 23:
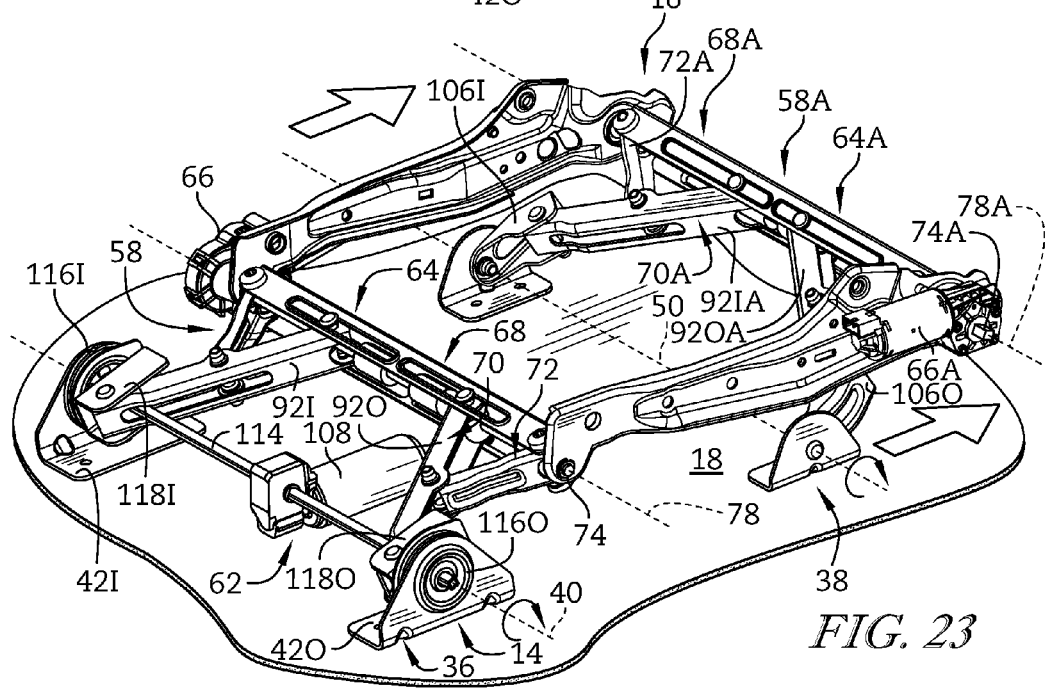

FIG. 22 is a perspective view of the seat mover system of FIG. 1 in the fully-raised forward configuration and suggesting that the rotator unit is configured to cause the first lift unit to rotate about the front pivot axis to move the seat mover system forward and rearward between the forward and rearward arrangements; and FIG. 23 is a view similar to FIG. 22 after the seat mover system has been moved to the fully-raised rearward configuration and showing that the third actuator has caused the axle to rotate about the front pivot axis to cause the first lift unit to rotate about the front pivot axis and cause the seat mover system to move rearward toward the back of the vehicle.

DETAILED DESCRIPTION

A seat mover system 16 in accordance with the present disclosure is adapted for use in a seat system 10 used in vehicles as suggested in FIG. 1-4. Seat system 10 is illustratively configured to support an occupant of the vehicle above a vehicle floor 18 included in the vehicle and move relative to vehicle floor 18 to support the occupant in a plurality of positions. Seat system 10 is configured to provide means for supporting the occupant at various configurations of heights, tilt angles, and translational positions relative to vehicle floor 18 so that comfort and safety of the occupant is maximized.

Figure 8:
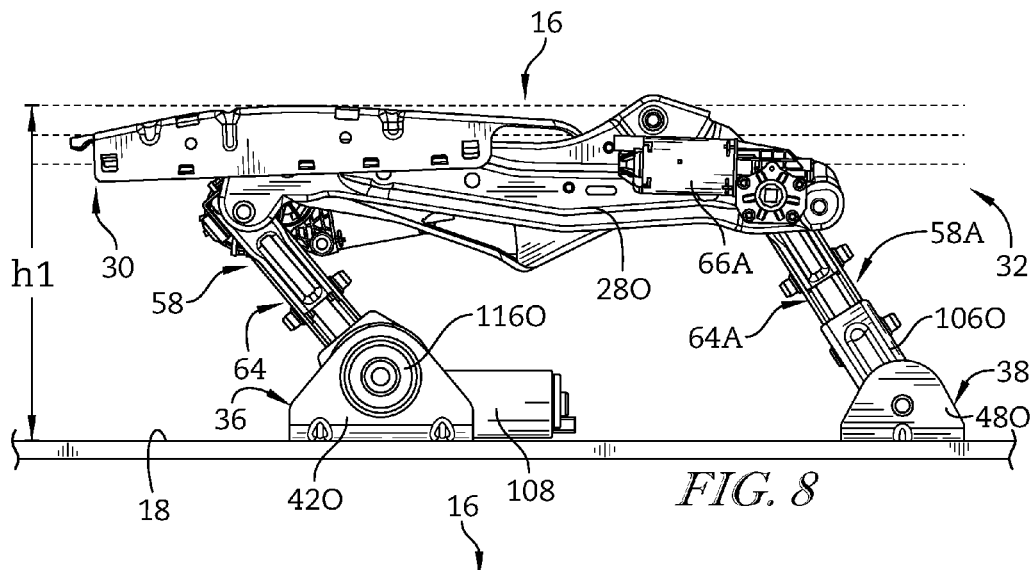
Figure 9:
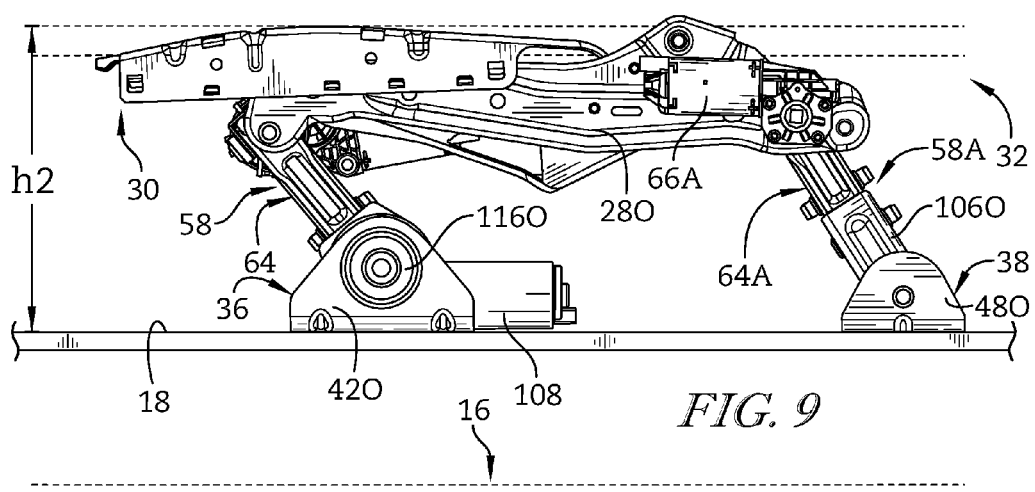
Figure 10:
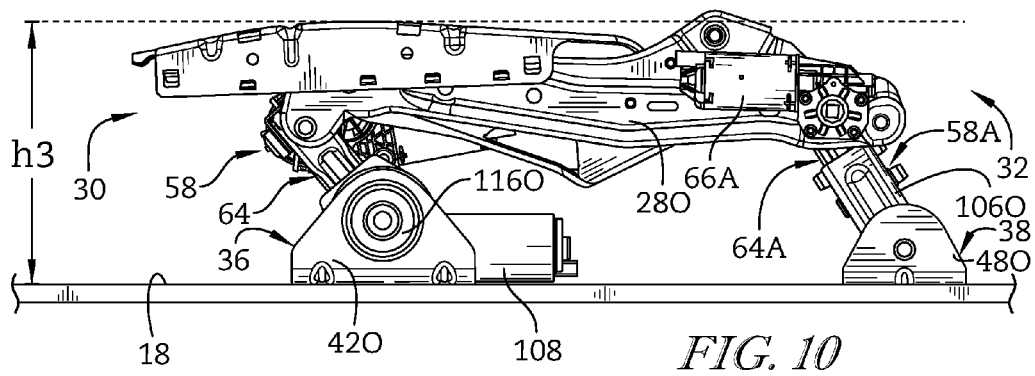
Figure 11:
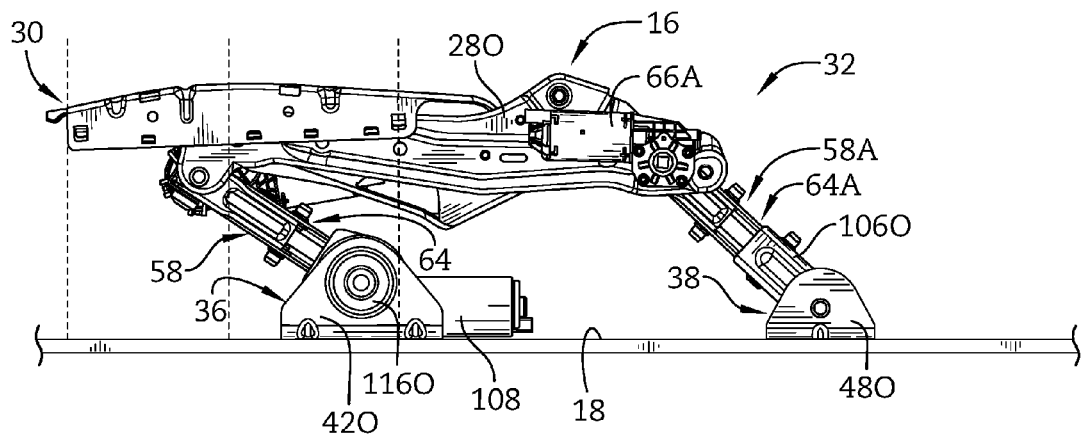
Figure 12:
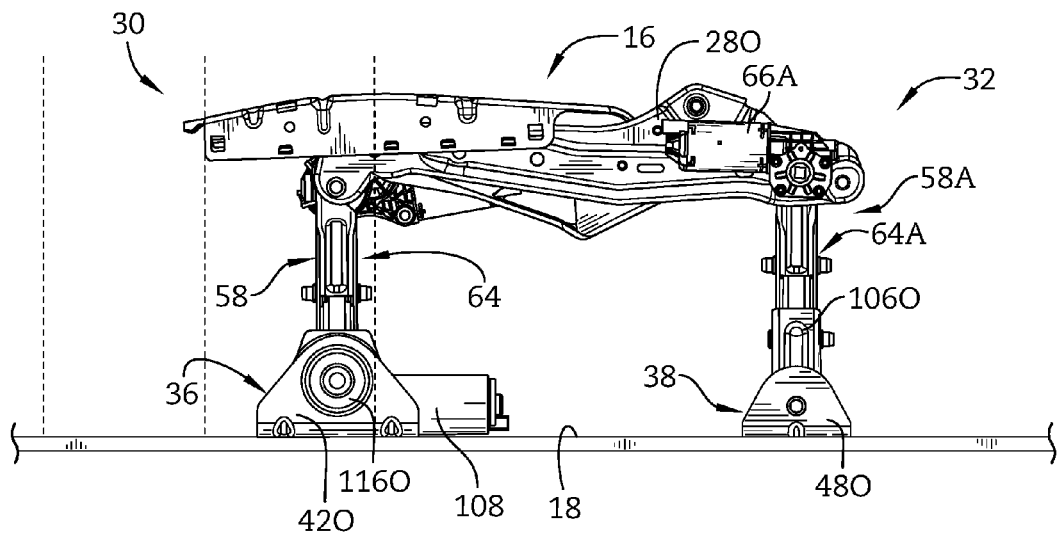
Figure 13:
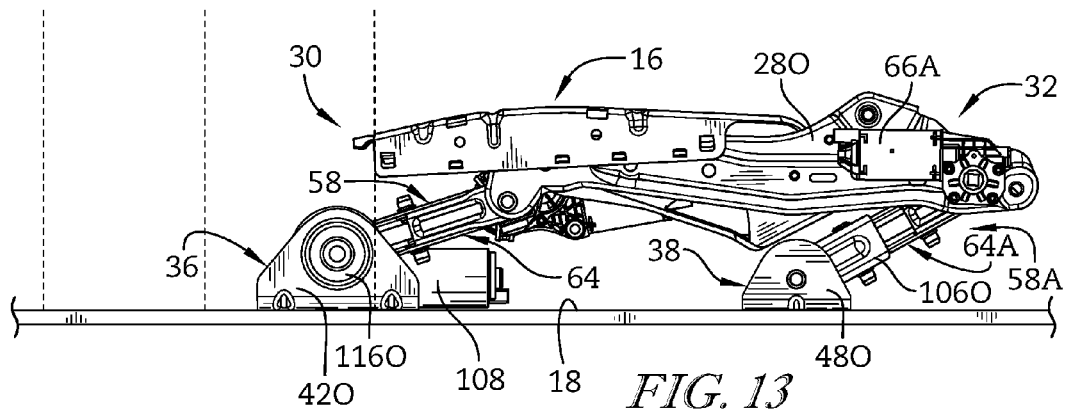

Seat system 10 includes a vehicle seat 12, a seat foundation 14, and a seat mover system 16 as shown in FIGS. 1-4 and 5. Vehicle seat 12 is arranged to support the occupant above vehicle floor 18. Seat foundation 14 is arranged to couple seat system 10 to vehicle floor 18. Seat mover system 16 is arranged to move vehicle seat 12 upwards and downwards relative to foundation 14, as shown in FIGS. 8-10, forward and rearward, as shown in FIGS. 11-13, and further arranged to vary the tilt angle of vehicle seat 12.

Figures 3, 4:
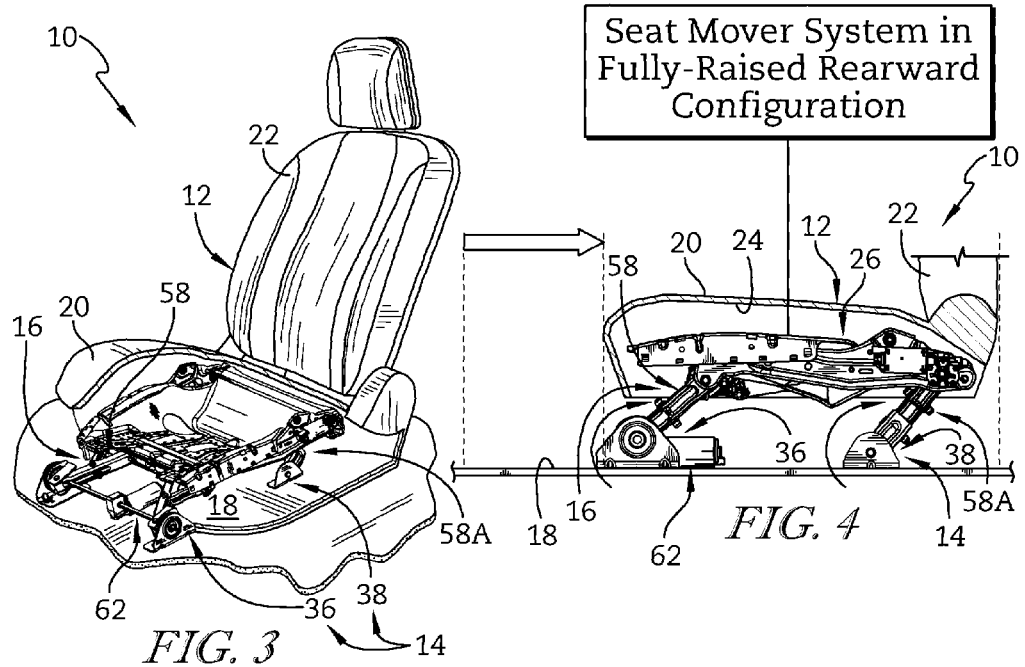

As an example, seat mover system 16 is configured to move between a fully-raised forward configuration shown in FIGS. 1 and 2 and a fully-raised rearward configuration without discrete or separate tilt, height, and longitudinal movements as shown in FIGS. 3 and 4. During the movement, tilt, height, and longitudinal position are all varied together in parallel to arrive at the different configuration.

Seat mover system 16 includes a first lift unit 58, a second lift unit 58A, and a rotator unit 62. First lift unit 58 is configured to provide means for moving vehicle seat 12 relative to seat foundation 14 to vary one or both of the height and the tilt angle of the vehicle seat. Second lift unit 58A configured to provide means for moving vehicle seat 12 relative to seat foundation 14 to vary one or both of the height and the tilt angle of vehicle seat 12. Rotator unit 62 configured to provide means for moving vehicle seat 12 relative to seat foundation 14 to vary one or both of the height and a translational position of vehicle seat 12 as shown in FIGS. 1-4.

Figure 7:
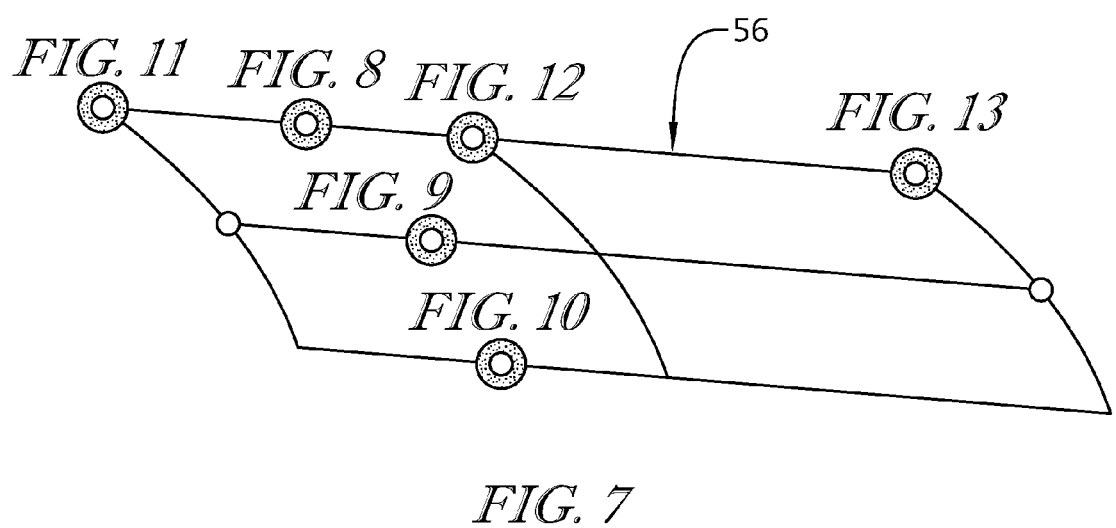

As shown in FIG. 7, seat mover system 16 is arranged to move selectively vehicle seat 12 between an infinite number of configurations defined by an envelope of motion 56. Envelope of motion 56 defines a range of possible configurations of seat mover system 16. Fully-raised and fully-lowered positions of first and second lift units 58, 58A define vertical boundaries for seat mover system 16. Forward and rearward arrangements of rotator unit 62 define horizontal boundaries for seat mover system 16. Seat mover system 16 is configured to move within the vertical and horizontal boundaries into a plurality of partially expanded positions and intermediate arrangements.

Figure 5:
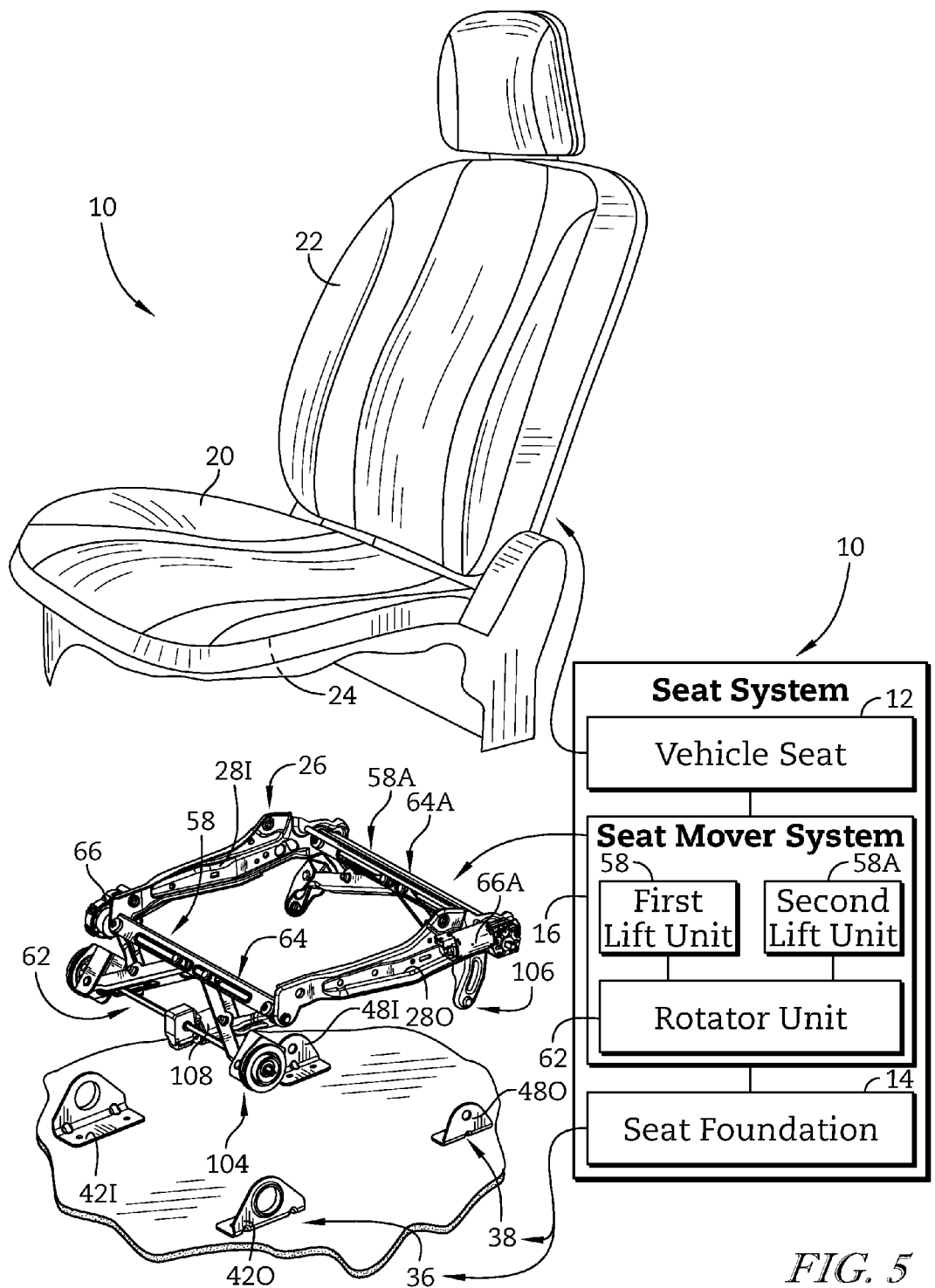

Seat system 10 includes vehicle seat 12, seat foundation 14, and seat mover system 16 as shown in FIG. 5. Vehicle seat 12 is configured to support the occupant of the vehicle a height above vehicle floor 18. Seat foundation 14 anchors seat system 10 to vehicle floor 18 for movement therewith. Seat mover system 16 interconnects seat foundation 14 and vehicle seat 12 and is configured to move vehicle seat 12 relative to seat foundation 14 so that the occupant may be supported at various configurations of heights, tilt angles, and translational positions relative to vehicle floor 18 as suggested in FIGS. 7-13.

Vehicle seat 12 includes a seat bottom 20 and a seat back 22 as shown in FIG. 5. Seat bottom 20 is configured to support the occupant above vehicle floor 18. Seat bottom 20 is arranged to surround at least a portion of seat foundation 14 and seat mover system 16 to limit access to seat foundation 14 and seat mover system 16. Seat back 22 extends upwardly away from seat bottom 20. Seat back 22 is coupled to seat bottom 20 to pivot back and forth relative to seat bottom 20.

Figure 6:
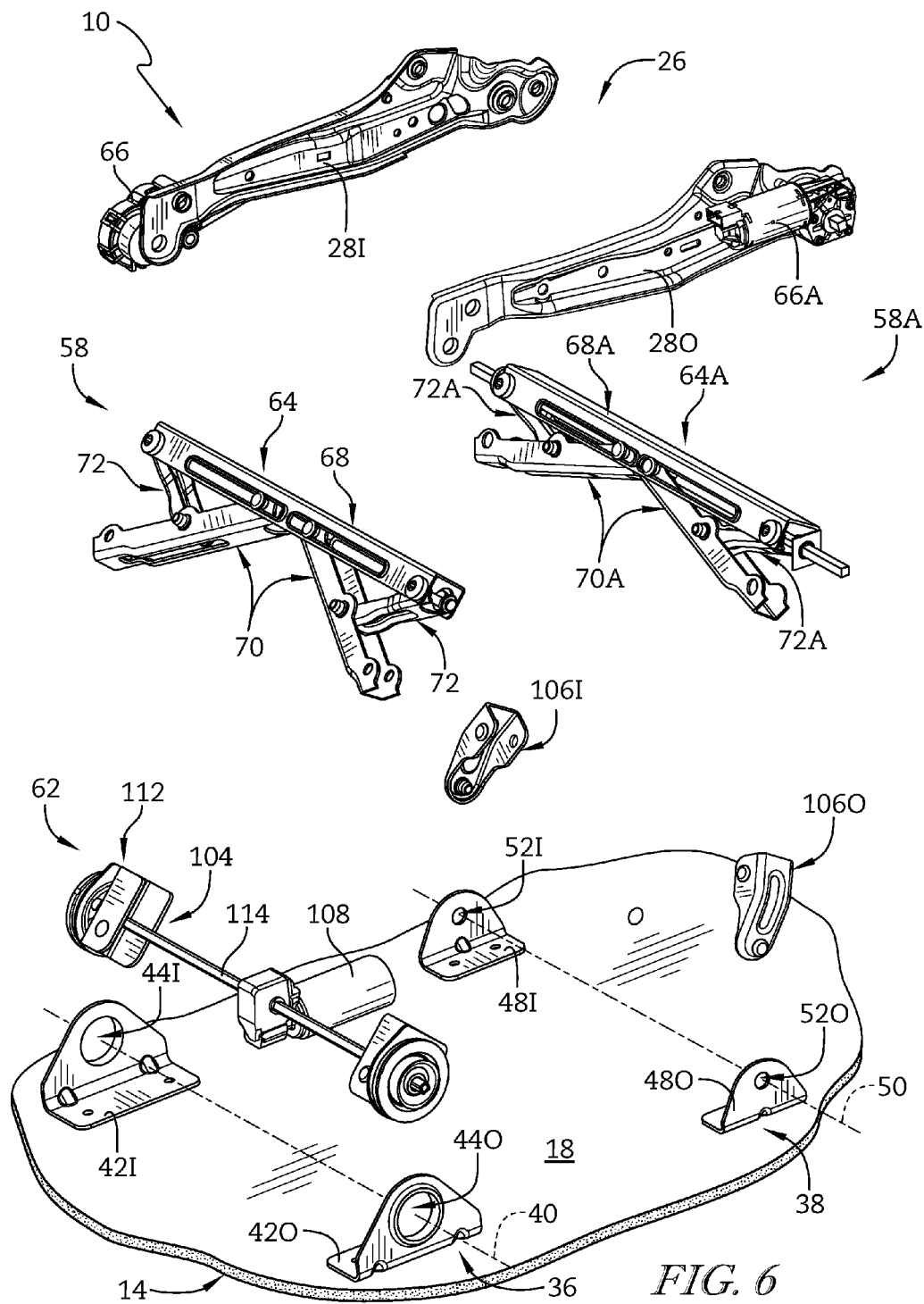

Seat bottom 20 includes a seat cushion 24 and a seat frame 26 as shown in FIG. 5. Seat cushion 24 provides a sitting surface for supporting the occupant. Seat frame 26 couples vehicle seat 12 to seat mover system 16 for movement therewith. Seat frame 26 includes an inner frame member 28I and an outer frame member 28O spaced apart from inner frame member 28I as shown in FIG. 6. Inner and outer frame members 28I, 28O extend between a front end 30 and a rear end 32 of seat mover system 16.

Seat foundation 14 couples seat mover system 16 to vehicle floor 18 as suggested in FIGS. 5 and 6. Seat foundation 14 includes a first floor mount 36 and a second floor mount 38 spaced apart from first floor mount 36. First floor mount 36 is anchored to vehicle floor 18 for movement therewith. First floor mount 36 is coupled pivotably to front end 30 of seat mover system 16. Second floor mount 38 is anchored to vehicle floor 18 for movement therewith. Second floor mount 38 is coupled pivotably to rear end 32 of seat mover system 16.

First floor mount 36 includes an inner first floor mount 42I and an outer first floor mount 42O as shown in FIGS. 5 and 6. Each mount 42I, 42O is formed to include a first-mount receiving aperture 44I, 44O respectively. Each first-mount receiving aperture 44I, 44O is arranged to receive a portion of seat mover system 16 to pivotably couple first floor mount 36 to seat mover system 16. Inner first floor mount 42I is spaced apart from outer first floor mount 42O along a first pivot axis 40 as shown in FIG. 6. Illustratively, center points of first-mount receiving apertures 44I, 44O lie on first pivot axis 40.

Second floor mount 38 includes an inner second floor mount 48I and an outer second floor mount 48O as shown in FIGS. 5 and 7. Each floor mount 48I, 48O is formed to include a second-mount receiving aperture 52I, 52O respectively. Each second-mount receiving aperture 52I, 52O is arranged to receive a portion of seat mover system 16 to couple pivotably second floor mount 38 to seat mover system 16. Inner second floor mount 48I is spaced apart from outer second floor mount 48O along a second pivot axis 50 as shown in FIG. 6. In the illustrative embodiment, second pivot axis 50 is spaced apart from and about parallel with first pivot axis 40. Illustratively, center points of second-mount receiving apertures 52I, 52O lie on second pivot axis 50.

Seat mover system 16 is arranged to move selectively vehicle seat 12 relative to vehicle floor 18 between an infinite number of configurations defined by envelope of motion 56 shown in FIG. 7. FIGS. 8-13 illustrate seat mover system 16 in a few of the infinite number of configurations included in envelope of motion 56. Seat mover system 16 is arranged to move vehicle seat 12 upward and downward, as shown in FIGS. 8-10, and forward and rearward, as shown in FIGS. 11-13. Seat mover system 16 may move front end 30 and rear end 32 upward and downward relative to the other to vary the tilt angle of vehicle seat 12. Seat mover system 16 is configured to move continuously between different configurations by combining simultaneously upward/downward movement with forward/backward movement.

Figure 15:
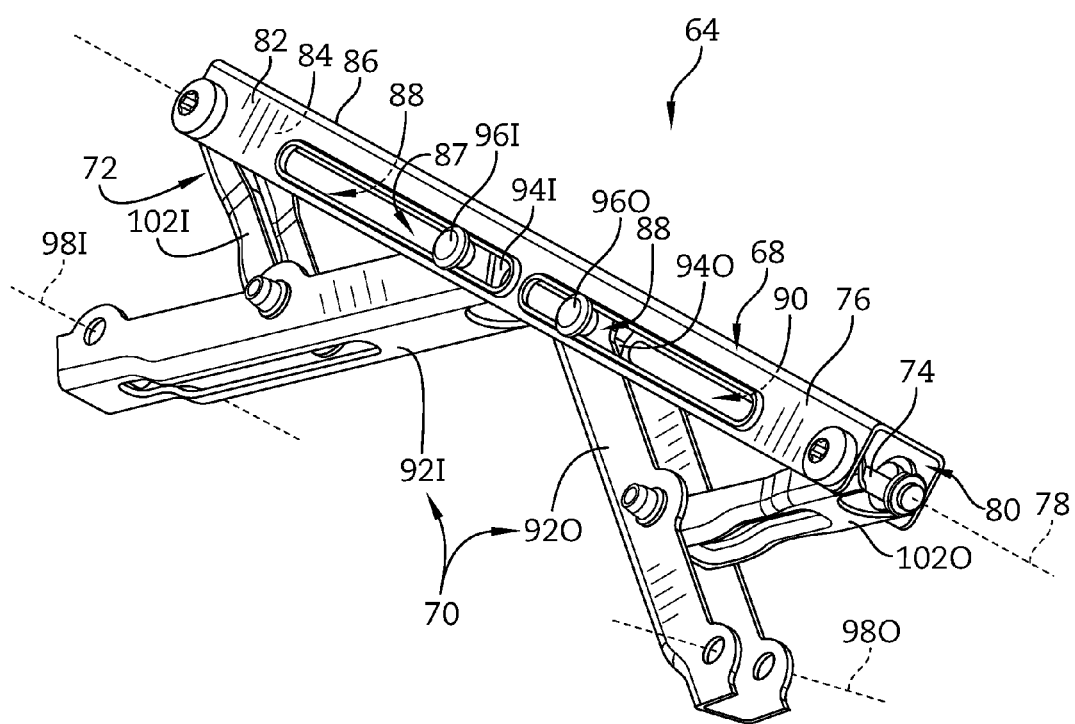
Figure 16:
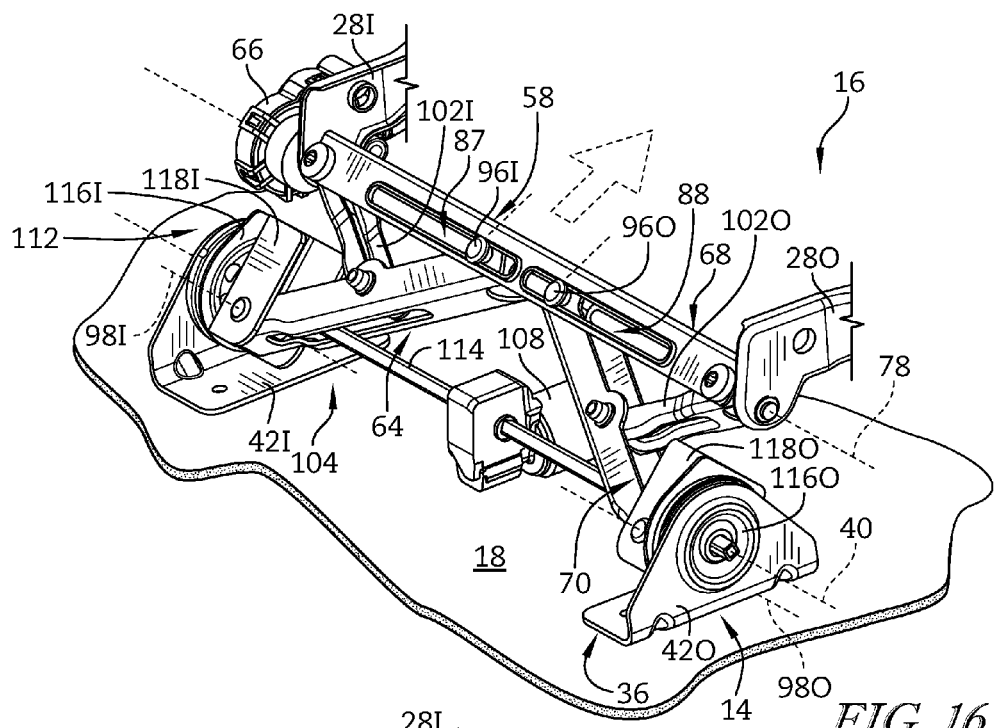
Figure 17:
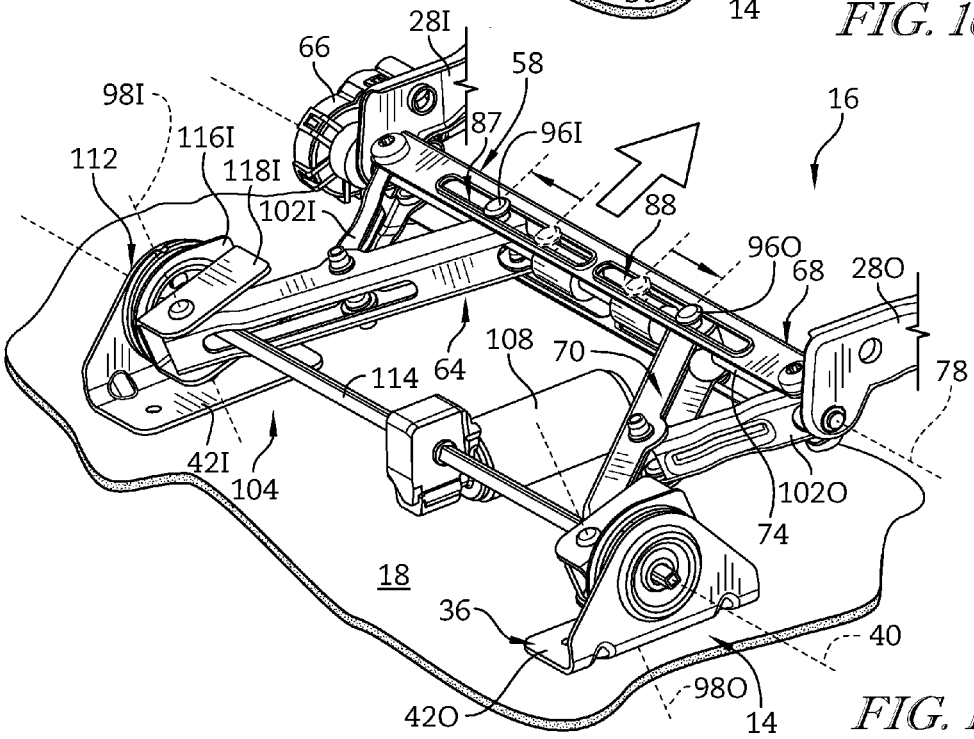
Figure 18:
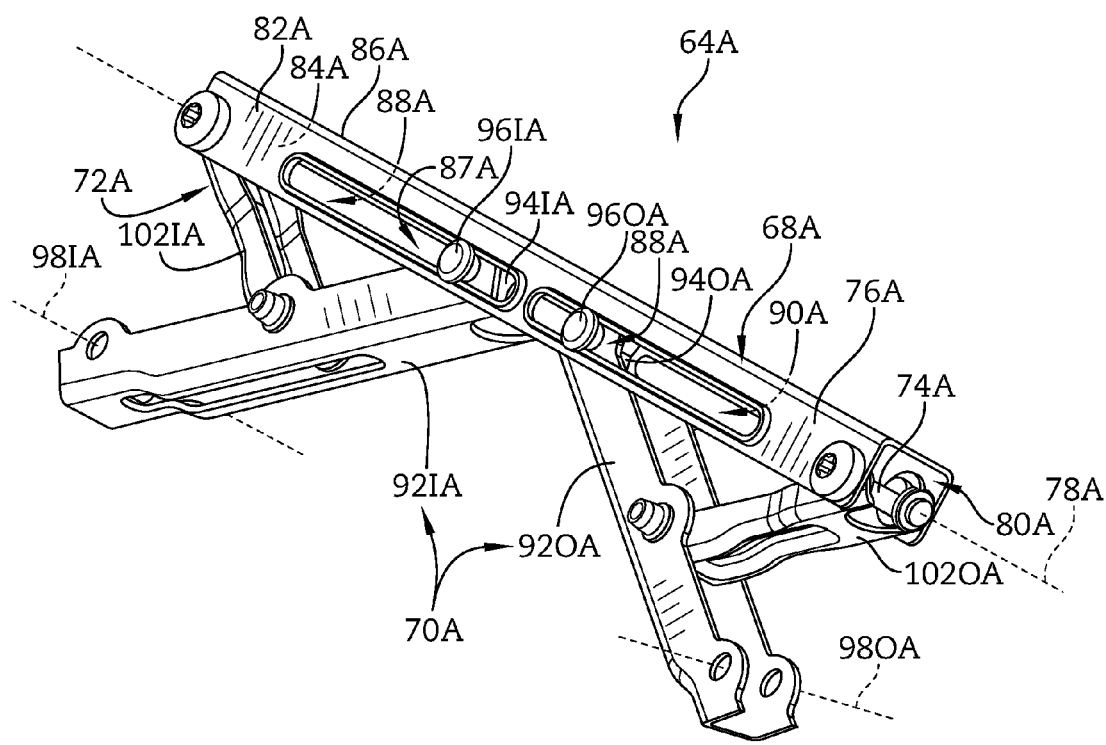
Figure 19:
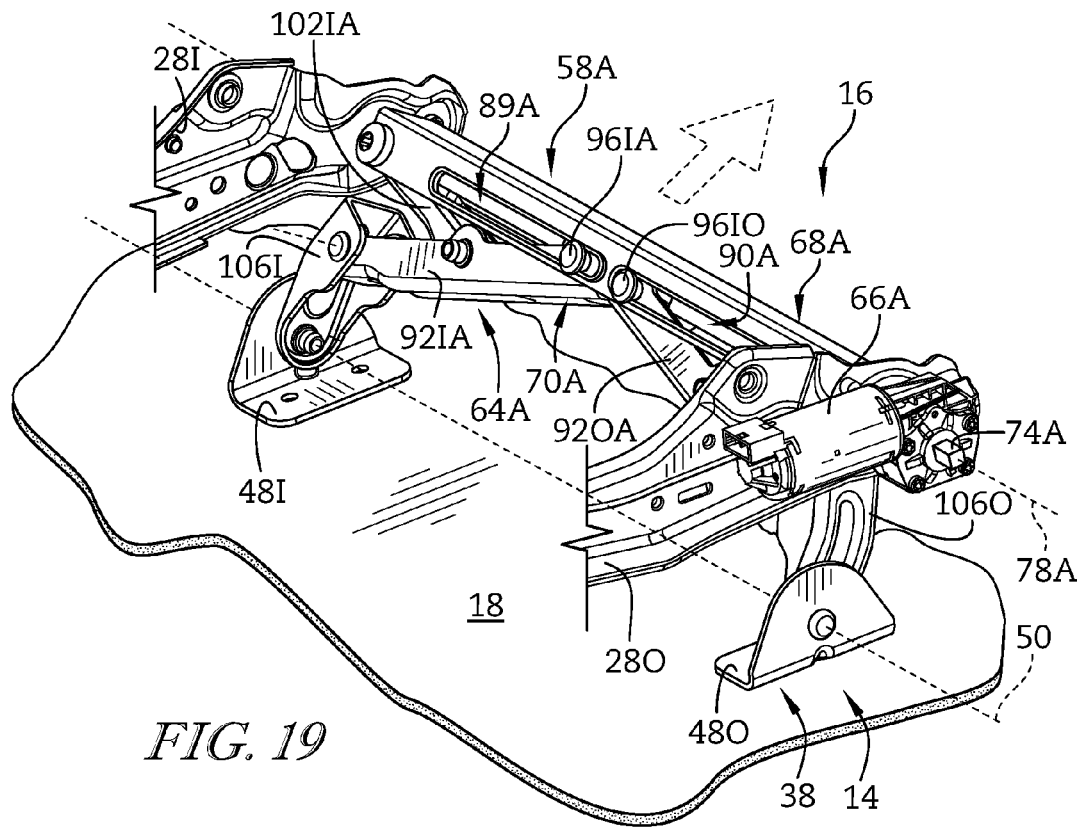
Figure 20:
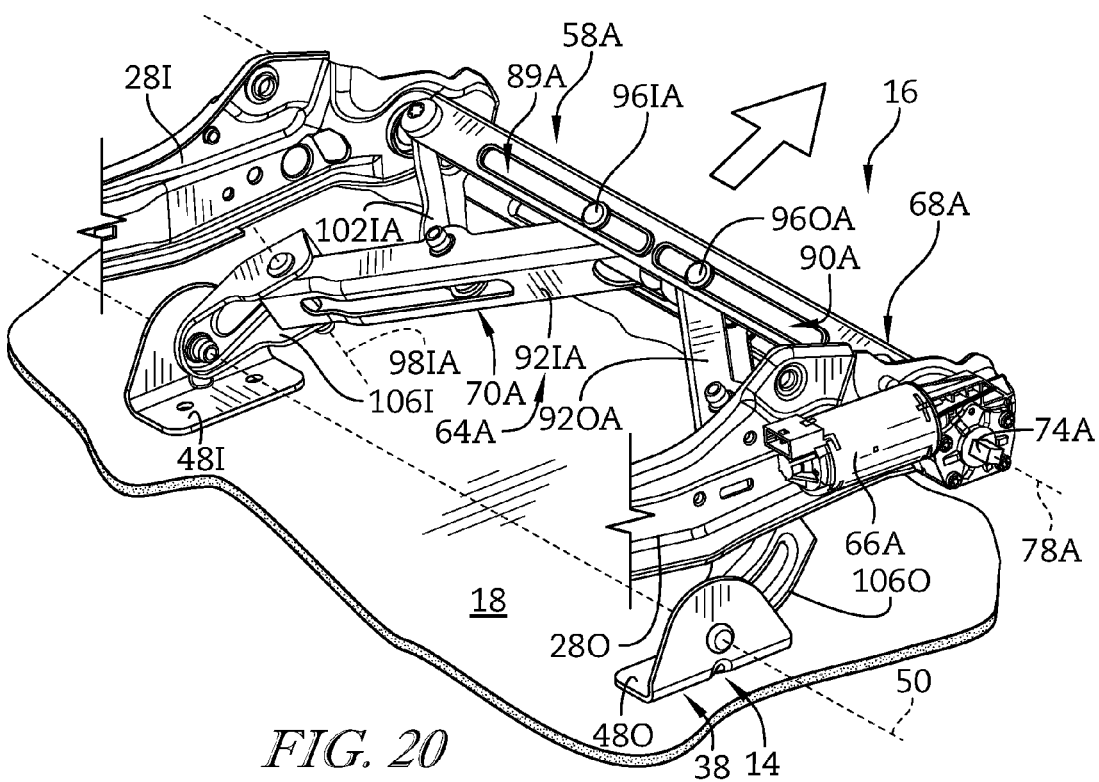
FIG. 20 is a view similar to FIG. 17 showing the second lift unit has moved to the partially-raised position in which the second support arms are positioned away from the center of the second mover housing to cause the second mover housing and a back of the seat frame to be spaced apart from the vehicle floor by a relatively larger height.

Seat mover system 16 includes first lift unit 58, second lift unit 58A, and rotator unit 62 as shown in FIGS. 5, 6, and 15. First lift unit 58 is configured to expand and contract between a fully-raised position and a fully-lowered position to move front end 30 of seat mover system 16 radially relative to first pivot axis 40 as shown in FIGS. 16 and 17. Second lift unit 58A is configured to expand and contract between a fully-raised position and a fully contracted position to move rear end 32 of seat mover system 16 radially relative to second pivot axis 50 as shown in FIGS. 19 and 20. Rotator unit 62 is configured to rotate first lift unit 58 about first pivot axis 40 between a forward arrangement and a rearward arrangement to cause lift units 58, 58A to move circumferentially relative to pivot axes 40, 50 respectively and cause seat bottom 20 to move forward and rearward relative to vehicle floor 18 as shown in FIGS. 22 and 23.

Seat mover system 16 is configured to move between an infinite number of configurations by combining positions of first and second lift units 58, 58A and arrangements of rotator unit 62. First and second lift units 58, 58A are configured to expand and contract between raised positions and lowered positions to move seat mover system 16 upward and downward as shown in FIGS. 8-10. As shown in FIG. 8, first and second lift units 58, 58A are in the raised positions to cause seat mover system 16 to be in a fully-raised intermediate configuration. When seat mover system 16 is in fully-raised configurations, vehicle seat 12 supports the occupant a relatively large first height h1 above vehicle floor 18. As discussed below, when seat mover system 16 is in intermediate configurations, vehicle seat 12 is located between a front end and a back end of the vehicle.

As shown in FIG. 9, first and second lift units 58, 58A are in partially-raised positions to cause seat mover system 16 to be in a partially-raised intermediate configuration. When seat mover system 16 is in partially-raised configurations, vehicle seat 12 supports the occupant at an intermediate second height h2 above vehicle floor 18. Illustratively, second height h2 is smaller than first height h1.

As shown in FIG. 10, first and second lift units 58, 58A are in the fully-lowered positions to cause seat mover system 16 to be in a fully-lowered intermediate configuration. When seat mover system 16 is in fully-lowered configurations, vehicle seat 12 supports the occupant at a relatively small third height h3 above vehicle floor 18. Illustratively, third height h3 is smaller than second height h2.

Rotator unit 62 is configured to rotate between a forward arrangement and a backward arrangement to move seat mover system 16 forward and rearward as shown in FIGS. 11-13. As shown in FIG. 11, rotator unit 62 is in a forward arrangement to cause seat mover system 16 to be in the fully-raised forward configuration. When seat mover system 16 is in a forward configuration, vehicle seat 12 supports the occupant toward the front end of the vehicle.

As shown in FIG. 12, rotator unit 62 is in an intermediate arrangement to cause seat mover system 16 to be in a fully-raised intermediate configuration. When seat mover system 16 is in intermediate configurations, vehicle seat 12 supports the occupant between the forward and rearward positions.

As shown in FIG. 13, rotator unit 62 is in the rearward arrangement to cause seat mover system 16 to be in the fully-raised rearward configuration. When seat mover system 16 is in rearward configurations, vehicle seat 12 supports the occupant toward the rear end of the vehicle.

Seat mover system 16 is configured to raise and lower selectively each of front end 30 and rear end 32 to vary the tilt angle of seat bottom 20. The occupant may vary the tilt angle alone or in combination with varying the height and/or the translational position. As an example, seat mover system 16 may lower front end 30 relative to rear end 32 while maintaining the height and translational position of the occupant.

Seat mover system 16 is configured to move between the extreme configurations bounding envelope of motion 56 and an infinite number of other configurations within envelope of motion 56 as shown in FIG. 7. Seat mover system 16 is adapted to vary any one or more of the height, translational position, and tilt angle of seat bottom 20 simultaneously to move from one configuration directly to another configuration. As an example, seat mover system 16 may move directly from the fully-raised forward configuration to the fully-lowered rearward configuration by lowering and translating seat bottom 20 simultaneously.

In some embodiments, seat mover system 16 may include a seat controller configured to receive a user input from the occupant. The user input may include instructions to vary one or more of the vehicle seat's 12 height, translational position, and tilt angle. Seat mover system 16 may be configured to move vehicle seat 12 in response to the user input and blocks vehicle seat 12 from moving relative to vehicle floor 18 when the user input is no longer received such as, for example, because vehicle seat 12 has reached the position desired by the occupant and the occupant has released the seat controller. In some embodiments, seat mover system 16 is blocked from varying one or more of the height, translational position, and tilt angle of vehicle seat 12 when seat mover system 16 is in a configuration located on an outer limit of envelope of motion 56.

Figure 14:
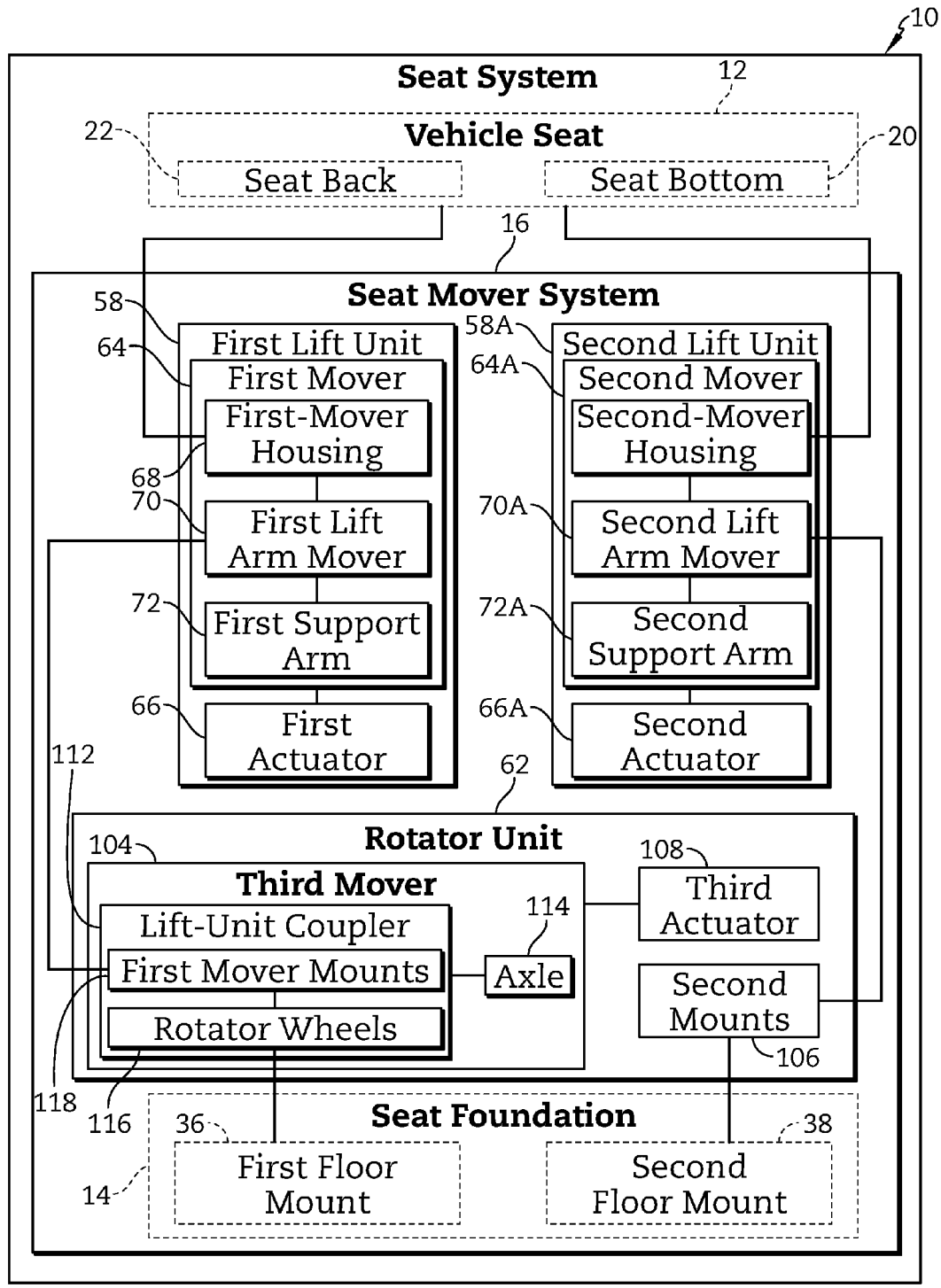

First lift unit 58 of seat mover system 16 includes a first mover 64 and a first actuator 66 as shown in FIGS. 14 and 15. First mover 64 interconnects rotator unit 62 and seat frame 26 of seat bottom 20 as shown in FIGS. 16 and 17. First mover 64 is configured to expand and contract radially relative to first pivot axis 40 to cause front end 30 of seat mover system 16 to move radially relative to first pivot axis 40 as shown in FIGS. 16 and 17. First mover 64 is coupled pivotably to rotator unit 62 and arranged to pivot about first pivot axis 40 to move circumferentially front end 30 relative to first pivot axis 40 as shown in FIGS. 22 and 23. First actuator 66 is connected to first mover 64 and configured to drive expansion and contraction of first mover 64.

First mover 64 is configured to expand, contract, pivot, and any combination thereof to move directly front end 30 from one position to another. As an example, first mover 64 may expand without pivoting about first pivot axis 40 to cause front end 30 to move radially outward relative to first pivot axis 40 as shown in FIGS. 16 and 17. Such radial movement may move front end 30 forwards or backwards and increase the height of front end 30 relative to vehicle floor 18. As another example, first mover 64 may contract and pivot simultaneously to lower the height of front end 30 without moving front end 30 forwards or backwards. As yet another example, first mover 64 may expand/contract and pivot about first pivot axis 40 simultaneously to move front end 30 forwards or backward without changing the height of front end 30.

First mover 64 includes a first-mover housing 68, a first lift arm mover 70, and a first support arm 72 as shown in FIGS. 14 and 15. First-mover housing 68 interconnects inner and outer frame members 28I, 28O to couple first mover 64 to seat bottom 20. First lift arm mover 70 interconnects first-mover housing 68 and rotator unit 62. First lift arm mover 70 is configured to move radially first-mover housing 68 relative to first pivot axis 40. First support arm 72 interconnects first lift arm mover 70 and first-mover housing 68 to support first-mover housing 68 and first lift arm mover 70.

First-mover housing 68 includes a first screw 74 and a housing body 76 as shown in FIG. 15. First screw 74 is configured to transmit mechanical motion between first actuator 66 and first lift arm mover 70 to drive first lift arm mover 70. Housing body 76 supports first screw 74 and guides movement of first lift arm mover 70.

First screw 74 extends along a first screw axis 78 and interconnects inner and outer frame members 28I, 28O as shown in FIG. 5. First screw 74 is received in a screw receiver channel 80 formed in housing body 76 and extends through a portion of first lift arm mover 70 as shown in FIG. 15. First screw 74 is threaded and meshed with first lift arm mover 70. First screw 74 is connected to first actuator 66 and is configured to be rotated about first screw axis 78 by first actuator 66.

Housing body 76 includes a first side wall 82, a second side wall 84 spaced apart from the first side wall 82, and a top wall 86 interconnecting first and second side walls 82, 84 as shown in FIG. 15. Housing body 76 is U-shaped and formed to include downwardly opening screw receiver channel 80. Screw receiver channel 80 extends along first screw axis 78 and receives first screw 74.

First side wall 82 is formed to include guide slots 87, 88 as shown in FIG. 15. Second side wall 84 is formed to include additional guide slots 89, 90 aligned with guide slots 87, 88 formed in first side wall 82. Guide slots 87, 88, 89, 90 extend axially relative to first screw axis 78 along a portion of housing body 76. Guide slots 87, 88, 89, 90 receive a portion of first lift arm mover 70 and control relative movement between first lift arm mover 70 and housing body 76.

First lift arm mover 70 includes an inner lift member 92I and an outer lift member 92O as shown in FIG. 15. Inner lift member 92I interconnects an inner portion of rotator unit 62 and an inner portion of first-mover housing 68. Outer lift member 92O interconnects an outer end of rotator unit 62 and an outer end of first-mover housing 68. Inner and outer lift members 92I, 92O are configured to move away from one another to cause first mover 64 to expand as shown in FIGS. 16 and 17 and to move toward one another to cause first mover 64 to contract.

Inner lift member 92I is coupled to rotator unit 62 at a lower end, coupled to housing body 76 at an upper end, and coupled to first support arm 72 at a midsection as shown in FIG. 15. Inner lift member 92I includes screw receiver 94I and guide pins 96I at the upper end of inner lift member 92I as shown in FIG. 15. Screw receiver 94I is meshed with first screw 74. Rotation of first screw 74 causes screw receiver 94I to move axially along first screw axis 78. Guide pins 96I extend into guide slots 87, 89 so that the upper end of inner lift member 92I is limited to movement along first screw axis 78.

Inner lift member 92I is configured to be rotated by rotator unit 62 to cause first mover 64 to pivot about first pivot axis 40. Inner lift member 92I is configured to pivot relative to rotator unit 62 about a first lift-arm pivot axis 98I when first lift arm mover 70 is driven by first screw 74 to cause first mover 64 to expand and contract. In the illustrative embodiment, inner lift member 92I is formed to include slots and apertures to reduce a weight of the inner lift member 92I.

Outer lift member 92O includes a screw receiver 94O and guide pins 96O as shown in FIG. 15. Outer lift member 92O is substantially similar to inner lift member 92I and, as such, only inner lift member 92I is discussed in detail.

First support arm 72 includes inner support arm 102I and outer support arm 102O as shown in FIG. 15. Inner support member 102I is coupled pivotably with housing body 76 at an upper end and coupled pivotably to the midsection of inner lift member 92I at a lower end. Inner support member 102I is configured to limit movement of inner lift member 92I when inner lift member 92I moves relative to housing body 76. In the illustrative embodiment, inner support member 102I is formed to include a slot to reduce a weight of inner support member 102I. Outer support arm 102O is substantially similar to inner support arm 102I and, as such, outer support arm 102O is not discussed in detail.

First actuator 66 is configured to drive first mover 64 such as, for example, when a user input is received by seat mover system 16 as suggested in FIGS. 16 and 17. First actuator 66 is configured to cause first screw 74 to rotate relative to first lift arm mover 70 about first screw axis 78. First actuator 66 is configured to cause first screw 74 to rotate in a first direction to cause first mover 64 to expand and to rotate in a second direction to cause first mover 64 to contract. In the illustrative embodiment, first actuator 66 is coupled to inner frame member 28I of seat frame 26. In other embodiments, first actuator 66 is coupled directly to first mover 64. First actuator 66 is illustratively an electro-mechanical screw actuator.

Referring to FIGS. 16 and 17, first actuator 66 is configured to cause first screw 74 to rotate about first screw axis 78 in the first direction in response to a user input, for example. Rotation of first screw 74 causes screw receivers 94I, 94O and, consequently, the upper ends of lift members 92I, 92O to move away from each other along first screw axis 78. Movement of the upper ends of lift members 92I, 92O is limited by guide pins 96I, 96O in guide slots 87, 88, 89, 90. As the upper ends of lift members 92I, 92O move away from one another, inner and outer lift members 92I, 92O pivot about lift-arm pivot axes 98I, 98O respectively and cause first mover 64 to expand and raise front end 30 of seat bottom 20 relative to vehicle floor 18. Support arms 102I, 102O pivot relative to first-mover housing 68 and lift members 92I, 92O as first mover 64 expands. First actuator 66 is configured to cause first screw 74 to rotate about first screw axis 78 in a second direction opposite the first direction to cause first mover 64 to contract and lower front end 30 of seat bottom 20.

Second lift unit 58A includes a second mover 64A and a second actuator 66A as shown in FIGS. 15 and 18-20. Second lift unit 58A is substantially similar to first lift unit 58 and, as such, only first lift unit 58 is discussed in detail.

Referring to FIGS. 19 and 20, second actuator 66A is configured to cause a second screw 74A of second lift unit 58A to rotate about second screw axis 78A in the first direction in response to a user input, for example. Rotation of second screw 74A causes screw receivers 94IA, 94OA and, consequently, the upper ends of lift members 92IA, 92OA to move away from each other along second screw axis 78A. Movement of upper ends of lift members 92IA, 92OA is limited by guide pins 96IA, 96OA in guide slots 87A, 88A, 89A, 90A. As the upper ends of lift members 92IA, 92OA move away from one another, inner and outer lift members 92IA, 92OA pivot about lift-arm pivot axes 98IA, 98OA respectively and cause second mover 64A to expand and raise rear end 32 of seat bottom 20 relative to vehicle floor 18. Support arms 102IA, 102OA pivot relative to second-mover housing 68A and lift members 92IA, 92OA as second mover 64A expands. Second actuator 66A is configured to cause second screw 74A to rotate about second screw axis 78A in a second direction opposite the first direction to cause second mover 64A to contract and lower rear end 32 of seat bottom 20 independent of first lift unit 58.

Rotator unit 62 includes a third mover 104, second mounts 106, and a third actuator 108, as shown in FIGS. 14 and 21-23. Third mover 104 is coupled pivotably to first floor mount 36 and arranged to move first lift unit 58 relative to vehicle floor 18. Second mounts 106 interconnect second lift unit 58A and second floor mounts 38. Third actuator 108 is connected to third mover 104 and configured to drive third mover 104 such as, for example, when a user input is received by seat mover system 16.

Third mover 104 includes a lift-unit coupler 112 and an axle 114 as shown in FIGS. 14 and 21-23. Lift-unit coupler 112 is arranged to couple pivotably first support arm 72 to first floor mount 36. Axle 114 interconnects lift-unit coupler 112 and third actuator 108 to transmit mechanical energy between third actuator 108 and lift-unit coupler 112.

Figure 21:
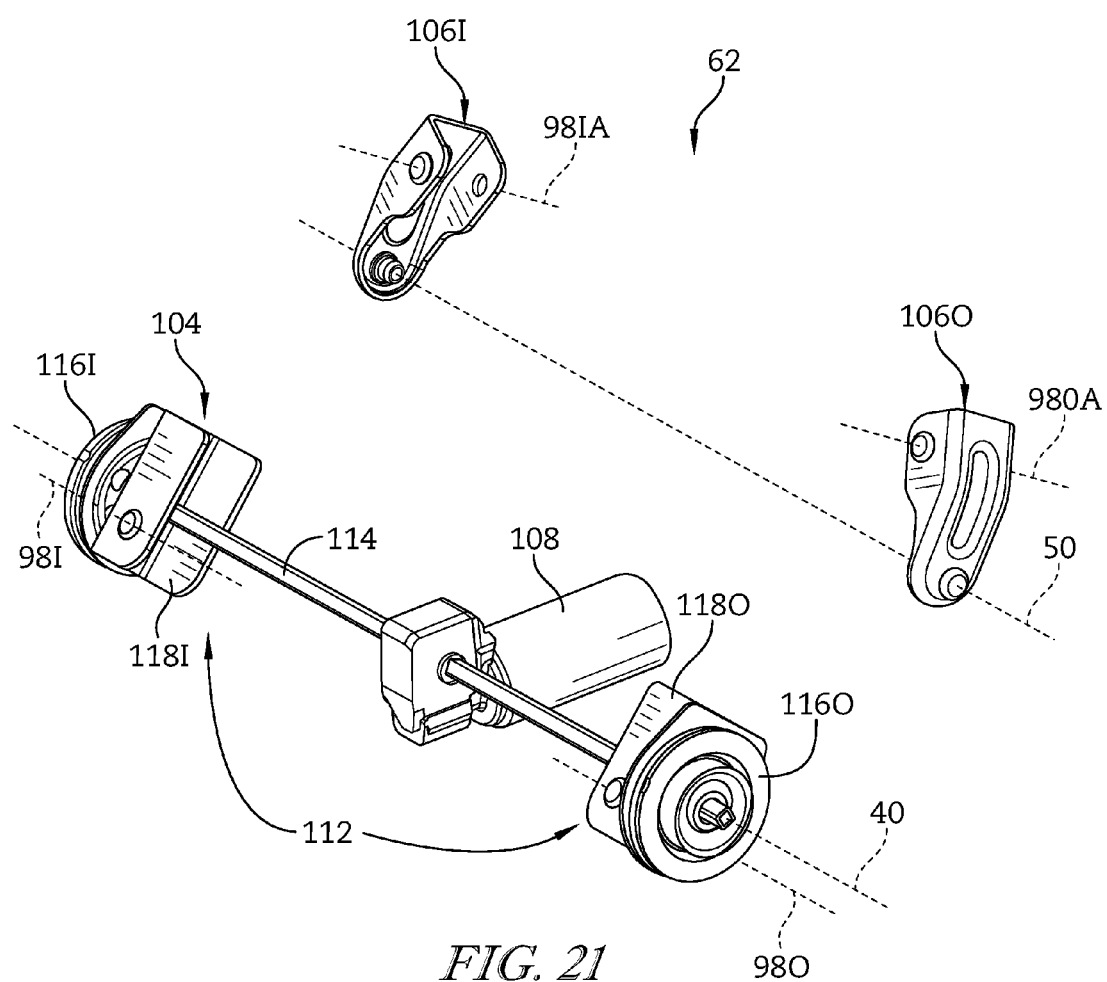
FIG. 21 is a perspective view of the rotator unit included in the seat mover system of FIG. 1 showing that the rotator unit includes the third mover including the lift-unit coupler arranged to be coupled pivotably to the first lift unit and the axle, the third actuator coupled to the axle, and second mounts configured to be coupled pivotably to the second lift unit.

Lift-unit coupler 112 includes inner and outer rotator wheels 116I, 116O and inner and outer first mover mounts 118I, 118O as shown in FIGS. 21-23. Rotator wheels 116I, 116O are coupled to first floor mounts 36 and configured to rotate about first pivot axis 40 relative to first floor mounts 36. First mover mounts 118I, 118O interconnect first support arm 72 and rotator wheels 116I, 116O.

Inner rotator wheel 116I is received in first-mount receiving aperture 44I of inner first floor mount 42I as shown in FIG. 5. Outer rotator wheel 116O is received in first-mount receiving aperture 44O of outer first floor mount 42O. Illustratively, wheels 116I, 116O are each disk-shape. Each wheel 116I, 116O is formed to include a circumferential channel that receives a portion of first mounts 42I, 42O to block axial movement of rotator wheels 116I, 116O relative to first pivot axis 40.

Inner first mover mount 118I is coupled to inner wheel 116I for rotational movement therewith as shown in FIG. 21. Outer first mover mount 118O is coupled to outer wheel 116O for rotational movement therewith.

In one example, inner and outer rotator wheels 116I, 116O are each a recliner locking mechanism used in a vehicle seat to block selectively movement of a seat back relative to a seat bottom. In another example, inner and outer rotator wheels 116I, 116O may be replaced by another mechanism configured to block selectively rotation about pivot axis 40 so that vehicle seat bottom remains in position during application of an impact force to the vehicle seat. In one example, third actuator 104 and rotator wheels 116I, 116O may be replaced with a linear actuator configured to control rotation about pivot axis 40. In another example, inner and outer rotator wheels 116I, 116O and third actuator 104 may be replaced with an e-pump mechanism used to vary a height of a seat bottom relative to foundation 14. The e-pump mechanism is available from Faurecia Automotive Seating, LLC.

Axle 114 extends along first pivot axis 40 and interconnects inner and outer wheels 116I, 116O as shown in FIG. 21. Axle 114 is arranged to be rotated about first pivot axis 40 by third actuator 108 to cause wheels 116I, 116O to rotate about first pivot axis 40 as shown in FIGS. 22 and 23. As wheels 116I, 116O rotate, first support arm 72 and, consequently, first mover 64 pivot about first pivot axis 40 to cause seat bottom 20 to move circumferentially about first pivot axis 40. In the illustrative embodiment, axle 114 has a square cross-section when viewed along first pivot axis 40.

Second mounts 106I, 106O interconnect second lift unit 58A and second floor mounts 38 as shown in FIG. 5. Second mounts 106I, 106O extend radially outward away from second floor mounts 38 relative to second pivot axis 50. Inner second mount 106I is coupled to inner lift member 92IA of second support arm 72A for rotational movement therewith about second pivot axis 50. Inner lift member 92IA is further configured to pivot about lift-arm pivot axis 98IA relative to inner second mount 106I as shown in FIGS. 16 and 17. In the illustrative embodiment, lift-arm pivot axis 98IA is about orthogonal to second pivot axis 50. Outer second mount 106O is coupled to outer lift member 92OA of second support arm 72A for rotational movement therewith about second pivot axis 50. Outer lift member 92OA is further configured to pivot about a lift-arm pivot axis 98OA relative to outer second mount 106O as suggested in FIGS. 19 and 20. In the illustrative embodiment, lift-arm pivot axis 98OA is about orthogonal to second pivot axis 50.

Third actuator 108 is arranged to drive third mover 104 such as, for example, when a user input is received by seat mover system 16 as shown in FIGS. 22 and 23. Third actuator 108 is configured to drive rotation of axle 114 about first pivot axis 40 to cause lift-unit coupler 112 to rotate about first pivot axis 40. First mover 64 pivots about first pivot axis 40 as lift-unit coupler 112 rotates to cause seat mover system 16 to move forward and rearward. Third actuator 108 is configured to cause axle 114 to rotate in a first direction to cause first mover 64 to pivot in a first direction and to rotate in a second direction to cause first mover 64 to pivot in a second direction opposite the first direction. In the illustrative embodiment, third actuator 108 is coupled to vehicle floor 18. Third actuator 108 is illustratively an electro-mechanical screw actuator.

A seat mover system in accordance with the present disclosure is a mechanism configured to adjust a position (fore/aft, tilt, and height) of a seat bottom relative to a vehicle floor. The mechanism adjusts position of the seat bottom in a continuous movement rather than several discrete movements. The seat mover system includes a motorized forward scissor jack mounted on a motorized front hinge pivotable about a horizontal pivot axis on a seat foundation and a motorized aft scissor jack mounted on a non-motorized aft hinge. The motorized scissor jacks cooperate to provide both tilt and height adjustment of the seat bottom. The motorized front hinge and non-motorized aft hinge cooperate to provide fore/aft translation of the seat bottom.

The seat mover system of the present disclosure is configured to reduce or minimize visual impact to occupants of the seat mover system. The seat mover system is further configured to maximize component integration, increase/maximize packaging flexibility and use of space, increase/maximize rear foot space for an occupant sitting behind a vehicle seat including the seat mover system. Furthermore, the seat mover system is configured to eliminate opportunities to damage/destroy shoes associated with rails or tracks included in some vehicle seats.

The seat mover system of the present disclosure integrates fore/aft translation, tilt, and height adjustment into one unit or assembly. A digital user experience is provided to an occupant that allows the occupant to move from one arrangement to another arrangement seamlessly and without discrete, serial adjustments. For example, an occupant can move a vehicle seat including the seat mover system from a forward, lowered position to a rear, raised position in one continuous movement rather than raising the seat bottom followed by a separate sliding movement.

The seat mover system creates a new way to move the seat bottom fore/aft, up/down, and tilt. The seat mover system includes two scissor jacks to create the up/down and tilt movement plus two rotational units that allow each scissor jack to pivot together lateral pivot axes and provide fore/aft translational movement. In one example, four motors are included in a seat mover system that work in unison to provide fore/aft, up/down, and tilt movement of the sat bottom. In another example, three motors are included in a seat mover system that work in unison to provide fore/aft, up/down, and tilt movement of the sat bottom.

The seat mover system of the present disclosure may minimize weight of the overall vehicle seat while providing increased functionality. The seat mover system may also minimize the number of parts needed to provide the desired range and types of motion. The seat mover system may also minimize tooling cost as the seat mover system is less sensitive to tolerance variations. The seat mover system may also use lower grade steel which may further minimize costs.

The invention claimed is:

1. A seat system for use in a vehicle comprising
a vehicle seat arranged to support an occupant above a vehicle floor included in the vehicle, and
a seat mover system configured to provide means for moving the vehicle seat continuously relative to the vehicle floor from one configuration to another different configuration by varying a tilt angle, a height, and a longitudinal position of the vehicle seat in parallel relative to the vehicle floor without separate tilt angle, height, and longitudinal movements,
wherein the seat mover system includes a first lift unit configured to provide means for moving a front end of the vehicle seat relative to the vehicle floor to vary at least one of the height and the tilt angle of the vehicle seat,
wherein the first lift unit includes a first mover that is configured to expand and contract radially relative to a first pivot axis to cause the front end of the vehicle seat to move radially relative to the first pivot axis and a first actuator that is connected to the first mover and configured to drive expansion and contraction of the first mover.

2. The seat system of claim 1, wherein the seat mover system further includes a second lift unit configured to provide means for moving a rear end of the vehicle seat relative to the vehicle floor to vary at least one of the height and the tilt angle of the vehicle seat.

3. The seat system of claim 2, wherein the second lift unit includes a second mover that is configured to expand and contract radially relative to a second pivot axis to cause the rear end of the vehicle seat to move radially relative to the second pivot axis and a second actuator that is connected to the second mover and configured to drive expansion and contraction of the second mover.

4. The seat system of claim 3, wherein the seat mover system further includes a rotator unit configured to provide means for moving the vehicle seat relative to the vehicle floor to vary at least one of the height and the longitudinal position of the vehicle seat.

5. The seat system of claim 4, wherein the rotator unit includes a third mover that is arranged to move the first lift unit circumferentially about the first pivot axis relative to the vehicle floor and a third actuator that is configured to drive the third mover.

6. The seat system of claim 1, wherein the seat mover system further includes a rotator unit configured to provide means for moving the vehicle seat relative to the vehicle floor to vary at least one of the height and the longitudinal position of the vehicle seat.

7. A seat system for use in a vehicle comprising
a vehicle seat arranged to support an occupant above a vehicle floor included in the vehicle, and
a seat mover system configured to provide means for moving the vehicle seat continuously relative to the vehicle floor from one configuration to another different configuration by varying a tilt angle, a height, and a longitudinal position of the vehicle seat in parallel relative to the vehicle floor without separate tilt angle, height, and longitudinal movements,
wherein the seat mover system includes a lift unit configured to provide means for moving a rear end of the vehicle seat relative to the vehicle floor to vary at least one of the height and the tilt angle of the vehicle seat,
wherein the lift unit includes a first mover that is configured to expand and contract radially relative to a pivot axis to cause the rear end of the vehicle seat to move radially relative to the pivot axis and a first actuator that is configured to drive expansion and contraction of the first mover.

8. The seat system of claim 7, wherein the seat mover system includes a second lift unit configured to provide means for moving a front end of the vehicle seat relative to the vehicle floor to vary at least one of the height and the tilt angle of the vehicle seat and the second lift unit includes a second mover that is configured to expand and contract radially relative to a second pivot axis to cause the front end of the vehicle seat to move radially relative to the second pivot axis and a second actuator that is connected to the second mover and configured to drive expansion and contraction of the second mover.

9. The seat system of claim 7, wherein the seat mover system further includes a rotator unit configured to provide means for moving the vehicle seat relative to the vehicle floor to vary at least one of the height and the longitudinal position of the vehicle seat.

10. The seat system of claim 9, wherein the rotator unit includes a second mover arranged to move the lift unit circumferentially about the pivot axis relative to the vehicle floor and a second actuator configured to drive the second mover.

11. A seat system for use in a vehicle comprising
a vehicle seat arranged to support an occupant above a vehicle floor included in the vehicle, and
a seat mover system configured to provide means for moving the vehicle seat continuously relative to the vehicle floor from one configuration to another different configuration by varying a tilt angle, a height, and a longitudinal position of the vehicle seat in parallel relative to the vehicle floor without separate tilt angle, height, and longitudinal movements,
wherein the seat mover system includes a rotator unit configured to provide means for moving the vehicle seat relative to the vehicle floor to vary at least one of the height and the longitudinal position of the vehicle seat,
wherein the rotator unit includes a first mover arranged to move the vehicle seat circumferentially about a pivot axis relative to the vehicle floor and a first actuator configured to drive the first mover.

12. The seat system of claim 11, wherein the seat mover system further includes a lift unit configured to provide means for moving a front end of the vehicle seat relative to the vehicle floor to vary at least one of the height and tilt angle of the vehicle seat.

13. The seat system of claim 12, wherein the seat mover system further includes a second lift unit configured to provide means for moving a rear end of the vehicle seat relative to the vehicle floor to vary at least one of the height and the tilt angle of the vehicle seat.

14. The seat system of claim 12, wherein the lift unit includes a second mover that interconnects the rotator unit and the vehicle seat and a second actuator connected to the second mover, the second mover is configured to expand and contract radially relative to the pivot axis to cause the front end of the vehicle seat to move radially relative to the pivot axis, and the second actuator is configured to drive expansion and contraction of the second mover.

15. A seat system for use in a vehicle comprising
a vehicle seat arranged to support an occupant above a vehicle floor included in the vehicle, and
a seat mover system including a first lift unit configured to move the vehicle seat relative to the vehicle floor to vary at least one of a height and a tilt angle of the vehicle seat, a second lift unit configured to move the vehicle seat relative to the vehicle floor to vary at least one of the height and the tilt angle of the vehicle seat, and a rotator unit configured to move the vehicle seat relative to the vehicle floor to vary at least one of the height and a translational position of the vehicle seat so as to move the vehicle seat continuously relative to the vehicle floor from one configuration to another different configuration by varying at least one of the tilt angle, the height, and the translational position of the vehicle seat simultaneously relative to the vehicle floor without separate tilt angle, height, and translational movements,
wherein the first lift unit includes a first scissor jack configured to expand and contract radially relative to a first pivot axis to cause a front end of the vehicle seat to move radially relative to the first pivot axis to vary at least one of the height and the tilt angle of the front end of the vehicle seat relative to the vehicle floor and the second lift unit includes a second scissor jack configured to expand and contract radially relative to a second pivot axis to cause a rear end of the vehicle seat to move radially relative to the second pivot axis to vary at least one of the height and tilt angle of the rear end of the vehicle seat relative to the vehicle floor.

16. The seat system of claim 15, wherein the rotator unit includes two rotational units and each rotational unit is coupled to one of the first and second scissor jacks to allow each scissor jack to pivot about the respective pivot axis and provide fore and aft translational movement of the vehicle seat.

* * * * *